United States Patent
Parsons et al.

(10) Patent No.: US 10,957,116 B2
(45) Date of Patent: Mar. 23, 2021

(54) GAP DETECTION FOR 3D MODELS

(71) Applicant: The Boeing Company, Chicago, IL (US)

(72) Inventors: James Parsons, Marysville, WA (US); Steven Malarkey, Lynnwood, WA (US); William McGarry, Federal Way, WA (US); Robert Brandt, Lake Stevens, WA (US); James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/124,625

(22) Filed: Sep. 7, 2018

(65) Prior Publication Data

US 2020/0082639 A1    Mar. 12, 2020

(51) Int. Cl.
*G06T 19/20*    (2011.01)
*G06T 17/20*    (2006.01)

(52) U.S. Cl.
CPC .............. *G06T 19/20* (2013.01); *G06T 17/20* (2013.01); *G06T 2219/2004* (2013.01); *G06T 2219/2008* (2013.01)

(58) Field of Classification Search
CPC . G06T 19/20; G06T 17/20; G06T 2219/2004; G06T 2219/2008; G06F 17/5095; G06F 17/50; G06F 17/5086; B64F 5/10; B64C 1/12; B64C 3/26; G05B 19/401; G05B 19/4099; G05B 19/41805; G05B 19/40931; G05B 19/4097;
(Continued)

(56) References Cited

U.S. PATENT DOCUMENTS

| | | | | |
|---|---|---|---|---|
| 5,907,489 A | * | 5/1999 | Elliott | ............... G05B 19/4097 700/103 |
| 2002/0026295 A1 | * | 2/2002 | Sato | ....................... G06T 19/20 703/1 |

(Continued)

OTHER PUBLICATIONS

NcNeely et al., "Six Degree-of-Freedom Haptic Rendering Using Voxel Sampling," SIGGRAPH '99: Proceedings of the 6th Annual Conference on Computer Graphics and Interactive Techniques, Jul. 1999, pp. 401-408.

*Primary Examiner* — Sultana M Zalalee
(74) *Attorney, Agent, or Firm* — Womble Bond Dickinson (US) LLP (57) ABSTRACT

A system for analysis of gaps between modeled parts of an assembly to be produced is provided. The system generates a three-dimensional (3D) visualization environment of 3D models of a plurality of parts in the assembly and performs an analysis of those of the 3D models within a given proximity to each other to determine gaps therebetween, including any non-acceptable gaps with gap distances that exceed an acceptable gap threshold. The system generates, for a non-acceptable gap, an instruction and automatically implements the instruction to correct the non-acceptable gap and confirms that the non-acceptable gap as corrected does not have a gap distance that exceeds the acceptable gap threshold. The system generates an output of a 3D model of the assembly populated with the 3D models and with the non-acceptable gap as corrected for use in connection with production of the assembly.

17 Claims, 8 Drawing Sheets

(58) Field of Classification Search
CPC .......... G05B 2219/35134; G05B 2219/49007;
G05B 19/402; G05B 19/41875; G05B
19/4207; G05B 2219/31424; G05B
2219/37008; G05B 2219/37196; G05B
2219/37197; G05B 2219/40298
See application file for complete search history.

(56) References Cited

U.S. PATENT DOCUMENTS

| | | | | |
|---|---|---|---|---|
| 2002/0123812 A1* | 9/2002 | Jayaram | ................ | G06T 19/20 700/98 |
| 2002/0162676 A1* | 11/2002 | Oe | ................ | H05K 13/0495 174/541 |
| 2003/0105542 A1* | 6/2003 | Arnold | ................ | G06Q 10/06 700/102 |
| 2003/0112239 A1* | 6/2003 | Shin | ................ | G06T 17/20 345/428 |
| 2005/0149298 A1* | 7/2005 | Soman | ................ | G05B 19/4097 702/189 |
| 2005/0151733 A1* | 7/2005 | Sander | ................ | G06T 17/20 345/423 |
| 2009/0109219 A1* | 4/2009 | DeCoro | ................ | G06T 17/20 345/423 |
| 2010/0114519 A1* | 5/2010 | Hollingshead | ......... | G01B 21/16 702/113 |
| 2010/0277476 A1* | 11/2010 | Johansson | ................ | G06T 17/20 345/423 |
| 2012/0029894 A1* | 2/2012 | Okutani | ................ | G06F 17/5018 703/9 |
| 2012/0316666 A1* | 12/2012 | Boyl-Davis | ...... | G05B 19/40931 700/98 |
| 2013/0129170 A1* | 5/2013 | Zheng | ................ | G06T 7/12 382/131 |
| 2014/0146047 A1* | 5/2014 | Wu | ................ | G06T 17/00 345/424 |
| 2015/0367579 A1* | 12/2015 | Laudrain | ............ | G05B 19/4099 700/98 |
| 2016/0189433 A1* | 6/2016 | Dayde | ................ | G06F 3/04815 345/419 |
| 2017/0138385 A1* | 5/2017 | Clark | ................ | G06F 17/5095 |
| 2017/0343984 A1* | 11/2017 | Czinger | ................ | B33Y 50/02 |
| 2018/0045218 A1* | 2/2018 | Mouza | ................ | F01D 25/243 |
| 2018/0050824 A1* | 2/2018 | Regnault | ............ | G05B 19/41805 |
| 2018/0285499 A1* | 10/2018 | Wilcox | ............... | G06F 17/5018 |
| 2018/0285511 A1* | 10/2018 | Demizu | ............... | G06F 17/5081 |

* cited by examiner

GAP DETECTION FOR 3D MODELS

TECHNOLOGICAL FIELD

The present disclosure relates generally to manufacturing an assembly, and in particular, to gap detection for three-dimensional (3D) models of an assembly to correct non-acceptable gaps before design release and manufacture of the assembly.

BACKGROUND

Unintended gaps between structural components or parts of an assembly, e.g., an aircraft, require expensive custom shims or fillers to be manufactured and installed to correct the unintended gaps. Unintended gaps can be one of the most costly types of defects on an aircraft. The undue stresses on parts of the aircraft deformed due to the unintended gaps can result in cracking and unsafe flight conditions.

One solution to detect unintended gaps is to visually inspect an area of the assembly using a digital pre-assembly environment, e.g., fly-throughs, to find erroneous or unintended gaps between structural parts of the assembly. However, there is a large number (e.g., millions) of parts of an assembly such as an aircraft and the parts may have small gaps between them. Thus, it may be impractical to find all the erroneous or unintended gaps using visual inspection. Also, visual inspection is time consuming. Moreover, some gaps may not be found via visual inspection until manufacture of the assembly. Some gaps may never get detected via visual inspection which can lead to critical safety problems on aircraft and other structural products.

Therefore, it would be desirable to have an automatic gap detection system and method that takes into account at least some of the issues discussed above, as well as other possible issues.

BRIEF SUMMARY

Example implementations of the present disclosure are directed to gap detection for 3D models of an assembly to correct non-acceptable gaps. Example implementations can automatically analyze all the parts on an assembly such as an aircraft to find all the parts that include non-acceptable gaps between them or are too far apart from each other. Example implementations can report the non-acceptable gaps to designers to fix the non-acceptable gaps. That is, example implementations can find and fix the non-acceptable gaps before design release and manufacture of the assembly, which can save the cost to fix the problems after design release and manufacture of the assembly. Also, example implementations can facilitate aircraft certification when no or fewer non-acceptable gaps exist.

The present disclosure thus includes, without limitation, the following example implementations.

Some example implementations provide a system for analysis of gaps between modeled parts of an assembly to be produced, comprising: a visualization application configured to generate a three-dimensional (3D) visualization environment of 3D models of a plurality of parts in the assembly, the 3D models being relatively positioned as are the plurality of parts in the assembly; a proximity analysis application configured to perform an analysis of those of the 3D models within a given proximity to each other to determine gaps there between, including any non-acceptable gaps with gap distances that exceed an acceptable gap threshold; and a data analysis application configured to generate, for a non-acceptable gap, an instruction enabling a first selection of a shim model from a plurality of different sized shim models to position within the non-acceptable gap, or a second selection of an adjustment to reposition one of the 3D models relative to another of the 3D models to reduce a gap distance of the non-acceptable gap, where the data analysis application is responsive to the instruction and further configured to automatically implement the first selection or the second selection to correct the non-acceptable gap, perform a further analysis to confirm that the non-acceptable gap as corrected does not have a gap distance that exceeds the acceptable gap threshold, and generate an output of a 3D model of the assembly populated with the 3D models of the parts relatively positioned and with the non-acceptable gap as corrected for use in connection with production of the assembly.

In some example implementations of the system of any preceding example implementation, or any combination of preceding example implementations, the system further comprises a processor, and a memory storing the visualization application that when executed by the processor causes the system to generate the 3D visualization environment of 3D models of the plurality of parts.

In some example implementations of the system of any preceding example implementation, or any combination of preceding example implementations, wherein the 3D models of the plurality of parts include polygonal models of the plurality of parts, and the proximity analysis application being configured to perform the analysis includes being configured to at least: define, for the polygonal models, a set of padded voxels inclosing a polygonal triangle mesh and used to determine a reduced candidate set of the polygonal models for analysis of gaps; and determine a minimum distance between each pair of the reduced candidate set of the polygonal models using a triangle-to-triangle minimum distance algorithm between the pair.

In some example implementations of the system of any preceding example implementation, or any combination of preceding example implementations, wherein the reduced candidate set of the polygonal models includes the polygonal models of only those of the plurality of parts with a physical or functional interface between them.

In some example implementations of the system of any preceding example implementation, or any combination of preceding example implementations, wherein the proximity analysis application being configured to perform the analysis includes being configured to perform the analysis to determine the gaps including an acceptable gap between two of the 3D models with a gap distance that exceeds the acceptable gap threshold, and an intervening one of the 3D models positioned therein.

In some example implementations of the system of any preceding example implementation, or any combination of preceding example implementations, wherein the data analysis application being configured to generate the instruction for the non-acceptable gap includes being configured to generate a respective instruction for each of the non-acceptable gaps, and wherein the data analysis application being responsive to the instruction and further configured to automatically implement the first selection or the second selection includes being responsive to the respective instruction and further configured to automatically implement the first selection or the second selection to correct all the non-acceptable gaps and release the 3D model of the assembly with all the non-acceptable gaps as corrected for production of the assembly.

In some example implementations of the system of any preceding example implementation, or any combination of preceding example implementations, wherein the data analysis application is further configured to generate, for another non-acceptable gap, an indication that neither the first selection nor the second selection are allowable to correct the other non-acceptable gap, and the data analysis application is responsive to the indication and further configured to generate another indication that production of the assembly is on hold.

Some example implementations provide a method of performing analysis of gaps between modeled parts of an assembly to be produced, comprising: generating a three-dimensional (3D) visualization environment of 3D models of a plurality of parts in the assembly, the 3D models being relatively positioned as are the plurality of parts in the assembly; performing an analysis of those of the 3D models within a given proximity to each other to determine gaps therebetween, including any non-acceptable gaps with gap distances that exceed an acceptable gap threshold; generating, for a non-acceptable gap, an instruction enabling a first selection of a shim model from a plurality of different sized shim models to position within the non-acceptable gap, or a second selection of an adjustment to reposition one of the 3D models relative to another of the 3D models to reduce a gap distance of the non-acceptable gap; and responsive to the instruction, automatically implementing the first selection or the second selection to correct the non-acceptable gap, performing a further analysis to confirm that the non-acceptable gap as corrected does not have a gap distance that exceeds the acceptable gap threshold, and generating an output of a 3D model of the assembly populated with the 3D models of the parts relatively positioned and with the non-acceptable gap as corrected for use in connection with production of the assembly.

Some example implementations provide a computer-readable storage medium for analysis of gaps between modeled parts of an assembly to be produced. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to gap detection for 3D models of an assembly, and in particular, to gap detection for 3D models of an assembly to correct non-acceptable gaps. The system is primarily described in the context of an assembly of component parts of an aircraft, but it should be understood that the system is equally applicable to assemblies of component parts of any of a number of types of vehicles such as any of a number of different types of manned or unmanned land vehicles, aircraft, spacecraft, watercraft or the like. In other examples, the assembly may be an assembly of component parts of other types of structural products. For example, the assembly can be buildings such as power plants, infrastructure items such as bridges, electro-mechanical structures such as windmills, or small items with complex assembles such as computers. The system may be also used in bio-medical field and oil exploration.

Figure 1:
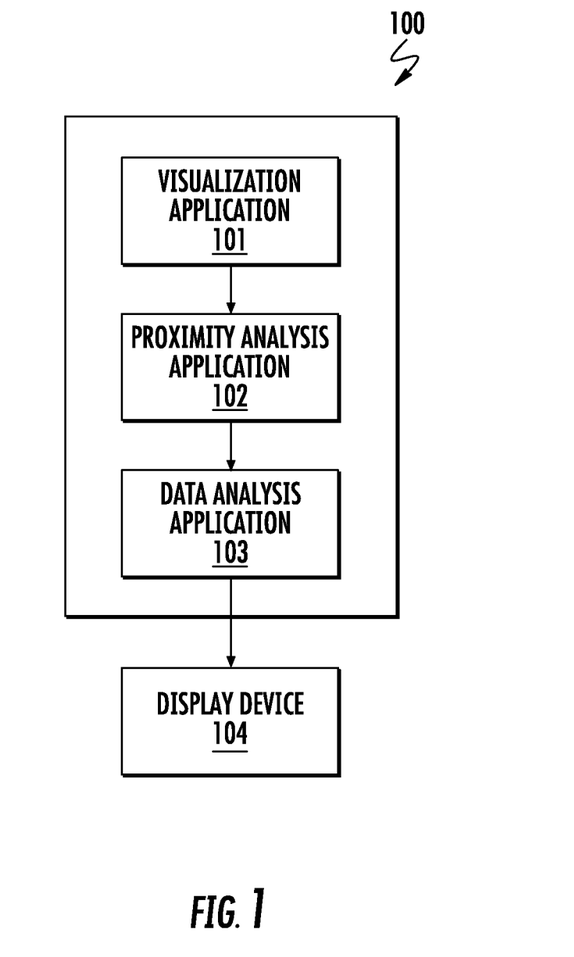
FIG. 1 illustrates a system for performing analysis of gaps between modeled parts of an assembly to be produced, according to example implementations of the present disclosure.

FIG. 1 illustrates a system 100 for engineering analysis of a structural product, according to example implementations of the present disclosure. In some examples, as described in greater detail with reference to FIG. 8, the system may be implemented by an apparatus that includes a processor and a memory storing executable instructions.

As shown, the system 100 includes any of a number of different subsystems (each an individual system) for performing one or more functions or operations. As shown, in some examples, the system includes one or more of each of a visualization application 101, a proximity analysis application 102, a data analysis application 103 and a display device 104. The subsystems may be co-located or directly coupled to one another, or in some examples, various ones of the subsystems may communicate with one another across one or more computer networks. Further, although shown as part of the system, it should be understood that any one or more of the visualization application, proximity analysis application, data analysis application or display device may function or operate as a separate system without regard to any of the other subsystems. It should also be understood that the system may include one or more additional or alternative subsystems than those shown in FIG. 1.

In some examples, the visualization application 101 is configured to generate a 3D visualization environment of 3D models of a plurality of parts in the assembly. The 3D models are relatively positioned as are the plurality of parts in the assembly. In some examples, the system 100 may be implemented by an apparatus that includes a processor and a memory storing the visualization application. When executed by the processor, the visualization application causes the system to generate the 3D visualization environment of 3D models of the plurality of parts. The 3D models may be computer-aided design (CAD) models.

The detection of gaps between modeled parts of the assembly can be performed by the proximity analysis application 102. In some examples, the proximity analysis application is configured to perform an analysis of those 3D models within a given proximity to each other to determine gaps therebetween. The gaps include any non-acceptable gaps with gap distances that exceed an acceptable gap threshold. In some examples, the gaps also include an acceptable gap between two of the 3D models that has a gap distance that exceeds the acceptable gap threshold. In these examples, the acceptable gap may have an intervening one of the 3D models positioned within the acceptable gap.

The detection of gaps may be performed on a subset of the 3D models of the plurality of parts. In some examples, the 3D models of the plurality of parts include polygonal models of the plurality of parts. The proximity analysis application 102 is configured to at least define, for the polygonal models, a set of padded voxels inclosing a polygonal triangle mesh and used to determine a reduced candidate set of the polygonal models for analysis of gaps. A voxel can be a volume element that represents a value on a regular grid in three-dimensional space. Padded voxels can be voxel elements that are added to the edges of the volume. The proximity analysis application is then configured to determine a minimum distance between each pair of the reduced candidate set of the polygonal models using an algorithm to calculate a triangle-to-triangle minimum distance between the pair. The triangle-to-triangle minimum distance can be the minimum distance between triangles on the meshes. In these examples, the reduced candidate set of the polygonal models includes the polygonal models of only those of the plurality of parts with a physical or functional interface between them.

To determine the minimum distance between each pair of the reduced candidate set of the polygonal models, the proximity analysis application 102 may need to perform some calculations.

In one example, a general query on the metadata of the CAD models can be performed to generate two sets (A, B) of models for gap analysis based on predetermined criteria. An acceptable gap tolerance distance can be chosen and a proximity threshold for checking the CAD models can be chosen. The proximity threshold may be used to eliminate models that normally would not need to be checked to reduce calculations. In one example, the proximity distance may be chosen using a software tool such as Voxmap PointShell (VPS) that uses volume elements (voxels) to solve spatial geometry problems.

In one example, the proximity analysis application 102 can iterate through the two sets of models to check if set A model's padded volume bounding boxes intersect set B model's padded volume bounding boxes. This can generate an initial list of candidate model pairs for gap analysis. The proximity analysis application can iterate through both sets of candidate models' solids to check if set A model's solids intersect set B model's solids padded volume bounding boxes. This can generate an initial list of solid pairs for gap analysis.

Then the proximity analysis application 102 can iterate through pairs of candidate solids and generate padded volume enclosing voxels for each individual solid. The proximity analysis application can iterate through the candidate set of solids pairs to check if set A solids intersect set B solids' voxels for each pair. This can generate a refined list of candidate solid pairs for final gap analysis.

The proximity analysis application 102 can then iterate through each of the candidate pairs and calculate the solids' individual triangles bounding volume box distances. If the distance falls within the desired proximity distance, then a minimum distance between the two triangles is calculated. If that distance is greater than the allowed gap tolerance and less than the proximity distance, then a flag is generated indicating that these solid pairs as having a non-acceptable gap.

To deal with the detected gaps, in some examples, the data analysis application 103 is configured to generate, for a non-acceptable gap, an instruction enabling a first selection of a shim model from a plurality of different sized shim models to position within the non-acceptable gap, or a second selection of an adjustment to reposition one of the 3D models relative to another of the 3D models to reduce a gap distance of the non-acceptable gap. In one example, the display device 104 can display the instruction including the first and second selections to a user, e.g., a designer of the assembly. The user can choose one of the selections for implementation to correct the non-acceptable gap.

In some examples, responsive to the instruction, the data analysis application 103 is configured to automatically implement the first selection or the second selection to correct the non-acceptable gap, perform a further analysis to confirm that the non-acceptable gap as corrected does not have a gap distance that exceeds the acceptable gap threshold, and generate an output of a 3D model of the assembly populated with the 3D models of the parts relatively positioned and with the non-acceptable gap as corrected for use in connection with production of the assembly. In one example, the user can design the assembly based on the released 3D model of the assembly with the non-acceptable gap as corrected. The data analysis application 101 can generate the 3D model of the assembly without any non-acceptable gap and release or provide the 3D model for design and manufacture of the assembly. The assembly can be manufactured with the non-acceptable gap corrected according to the first instruction or the second instruction.

In some examples, the data analysis application 103 is configured to generate a respective instruction for each of the non-acceptable gaps detected or determined by the proximity analysis application 102. Responsive to the respective instruction, the data analysis application is configured to automatically implement the first selection or the second selection to correct all the non-acceptable gaps and release the 3D model of the assembly with all the non-acceptable gaps as corrected for production of the assembly. In these examples, the design of the assembly based on the released 3D model can be released for manufacture since all the non-acceptable gaps have been corrected. The assembly can then be manufactured with all the non-acceptable gaps corrected according to the first instruction or the second instruction.

On the other hand, in some examples, the data analysis application 103 is further configured to generate, for another non-acceptable gap, an indication that neither the first selection nor the second selection are allowable to correct the other non-acceptable gap. Responsive to the indication, the data analysis application is further configured to generate another indication that production of the assembly is on hold. The data analysis application can generate the indication that production of the assembly should not proceed to manufacture until all the non-acceptable gaps have been corrected. In one example, a designer of the assembly may need to visually inspect the 3D models and correct the non-acceptable gap. After all the non-acceptable gaps have been corrected, the data analysis application may indicate that production of the assembly is no longer on hold and can proceed to manufacture.

Figure 2:
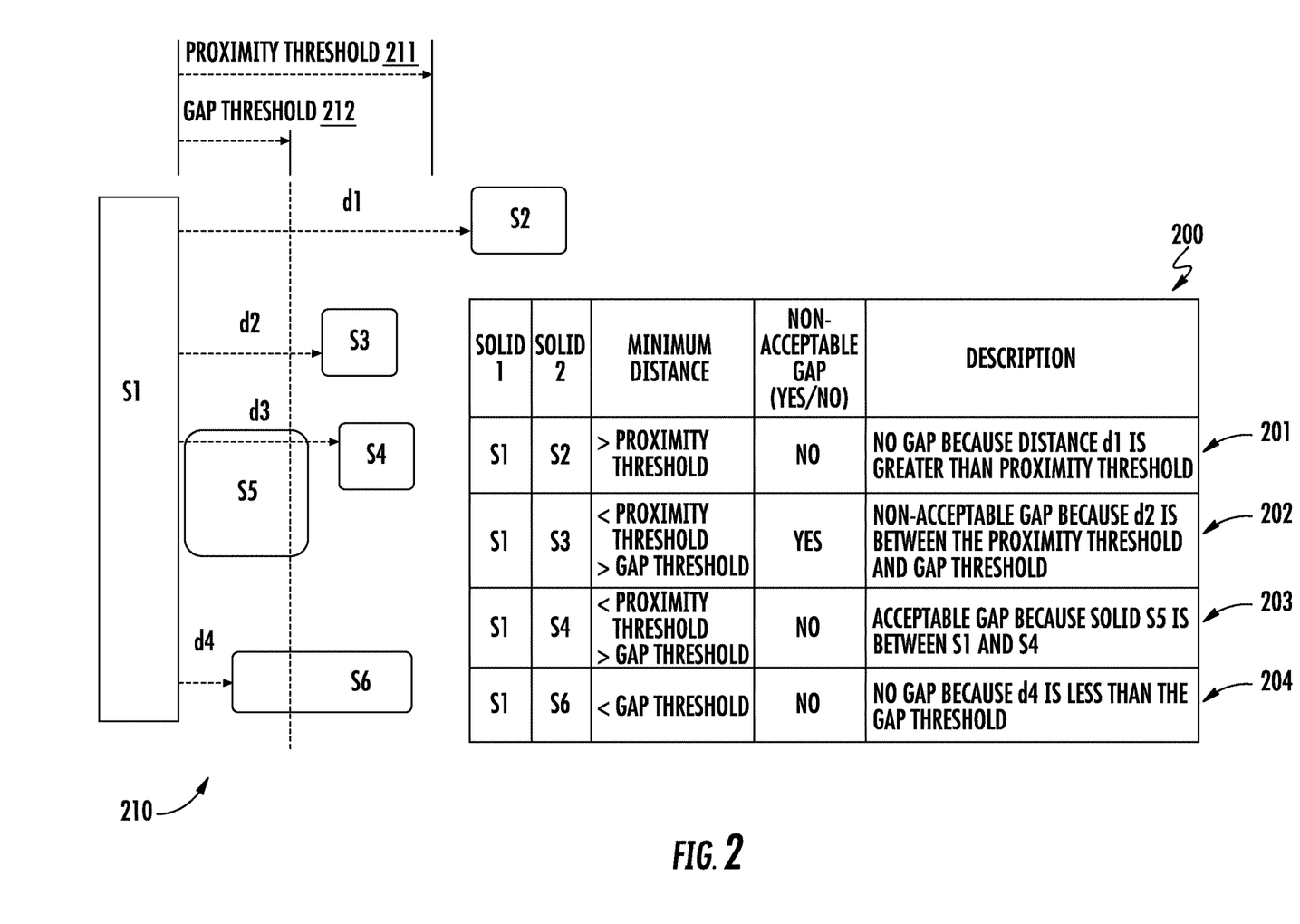
FIG. 2 illustrates possible conditions of gap analysis, according to various example implementations.

FIG. 2 illustrates possible conditions of gap analysis, according to various example implementations. In one example, the purpose of gap analysis is to identify solids or 3D models of the assembly that should be in contact but that have space between them. The analysis uses two distances, i.e., a given proximity threshold 211 and an acceptable gap threshold 212. Proximity analysis is used to find two solids that are near (i.e. within the proximity threshold of) each other. The acceptable gap threshold specifies the maximum allowed distance between the two solids. The process checks to ensure that there are no other solids between the two solids being analyzed. If the minimum calculated distance between the two solids is between the proximity threshold distance and the acceptable gap threshold, then the pair of the two solids is recorded as having a gap type including a non-acceptable gap between them.

As shown in FIG. 2, a table 200 lists some possible conditions of gap analysis performed by the proximity analysis application 102. In one example, as indicated by arrow 201, there is no gap between 3D models S1 and S2 because the distance d1 between S1 and S2 is greater than the proximity threshold 211 as shown in the left illustration 210 of FIG. 2. In this example, S1 and S2 may be designed to be separated from each other. In a second example, as indicated by arrow 202, there is a non-acceptable gap between 3D models S1 and S3 because the distance d2 between S1 and S3 is within the proximity and exceeds the acceptable gap threshold 212. In another example, as indicated by arrow 203, there is an acceptable gap between 3D models S1 and S4. Although the distance d3 between S1 and S4 exceeds the acceptable gap threshold, an intervening 3D model S5 is positioned in the gap between S1 and S4. Thus, in this example, the gap between S1 and S4 can be considered as acceptable for production of the assembly. In a further example, there is no gap between 3D models S1 and S6 because the distance d4 between S1 and S6 is less than the acceptable gap threshold. Thus, in this example, the distance between S1 and S6 is allowable for production of the assembly.

Figure 3:
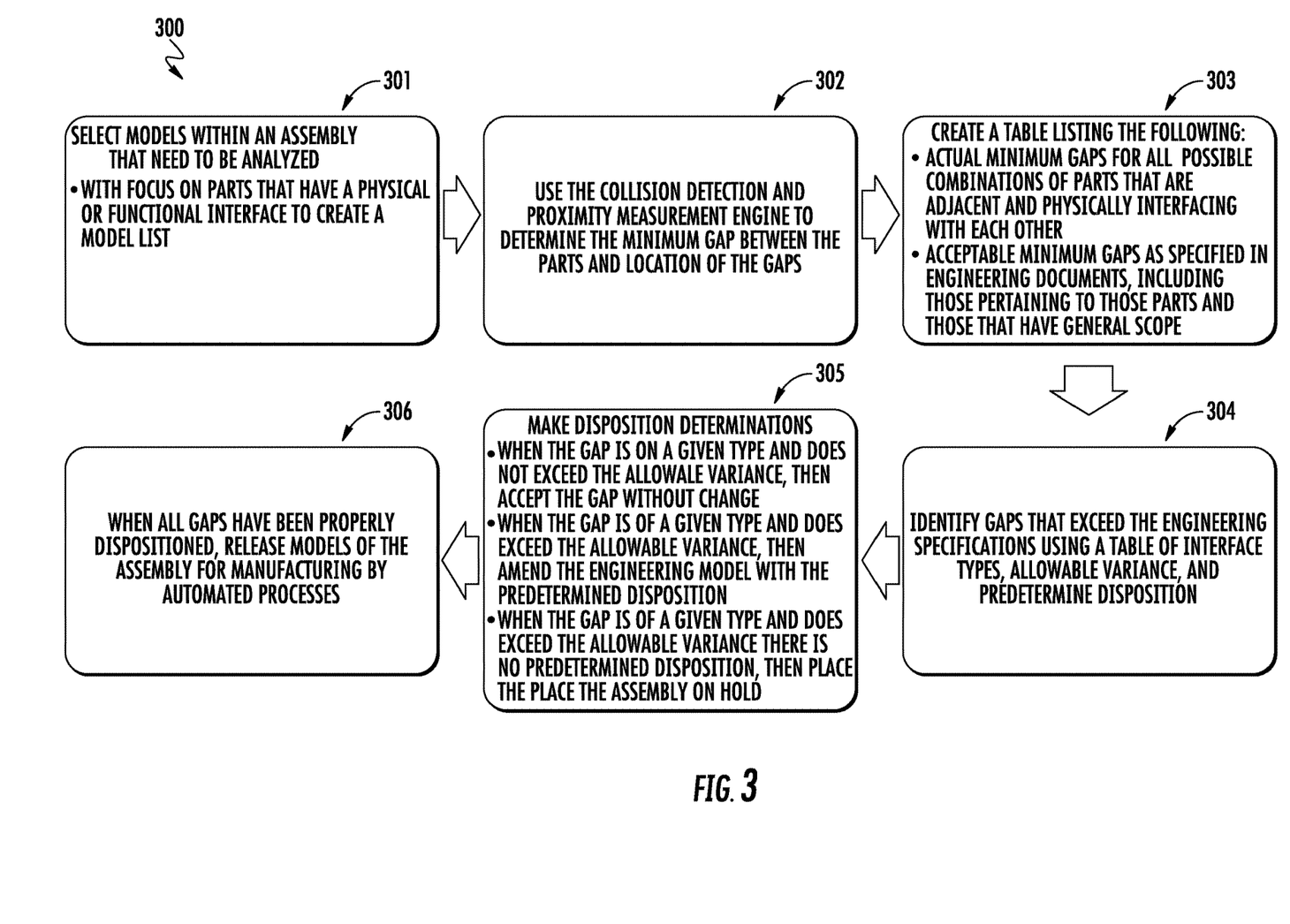
FIG. 3 illustrates a process of determining and correcting non-acceptable gaps, according to one example implementation.

FIG. 3 illustrates a process 300 of determining and correcting non-acceptable gaps, according to one example implementation. As shown, at block 301, the proximity analysis application 102 is configured to select 3D models within an assembly that need to be analyzed. In one example, the selection is focusing on structural parts that have a physical or functional interface to create a model list. At block 302, the proximity analysis application is configured to use a collision detection and proximity measurement engine to determine the minimum gaps between the parts and location of the gaps. The collision detection and proximity measurement engine may be included in the proximity analysis application. At block 303, the proximity analysis application is configured to create a table. The table may list actual minimum gaps for all possible combinations of parts that are adjacent and physically interfacing with each other. The table may also list acceptable minimum gaps as specified in engineering documents, including those gaps pertaining to those parts and those gaps that have general scope. At block 304, the proximity analysis application is configured to identify gaps that exceed the engineering specifications using a table of interface types, allowable variance, and predetermined disposition. The predetermined disposition may determine if a design of the assembly is acceptable or if a change to the design is needed. The predetermined disposition may also determine which part(s) of the assembly need to be modified or adjusted if a change to the design is needed.

At block 305, the data analysis application 103 is configured to make disposition determinations for the detected gaps. In one example, when the gap is of a given type and does not exceed the allowable variance, i.e., the acceptable gap threshold, then the gap is accepted without change. When the gap is of a given type and does exceed the allowable variance, then the data analysis application is configured to amend the engineering model with the predetermined disposition, e.g., using the first or the second selection to correct the gap as explained above. When the gap is of a given type and does exceed the allowable variance and there is no predetermined disposition, then the data analysis application is configured to generate an indication to place production of the assembly on hold. At block 306, when all gaps have been properly dispositioned, then the data analysis application is configured to release models of the assembly for manufacturing by automated processes.

Figure 4:
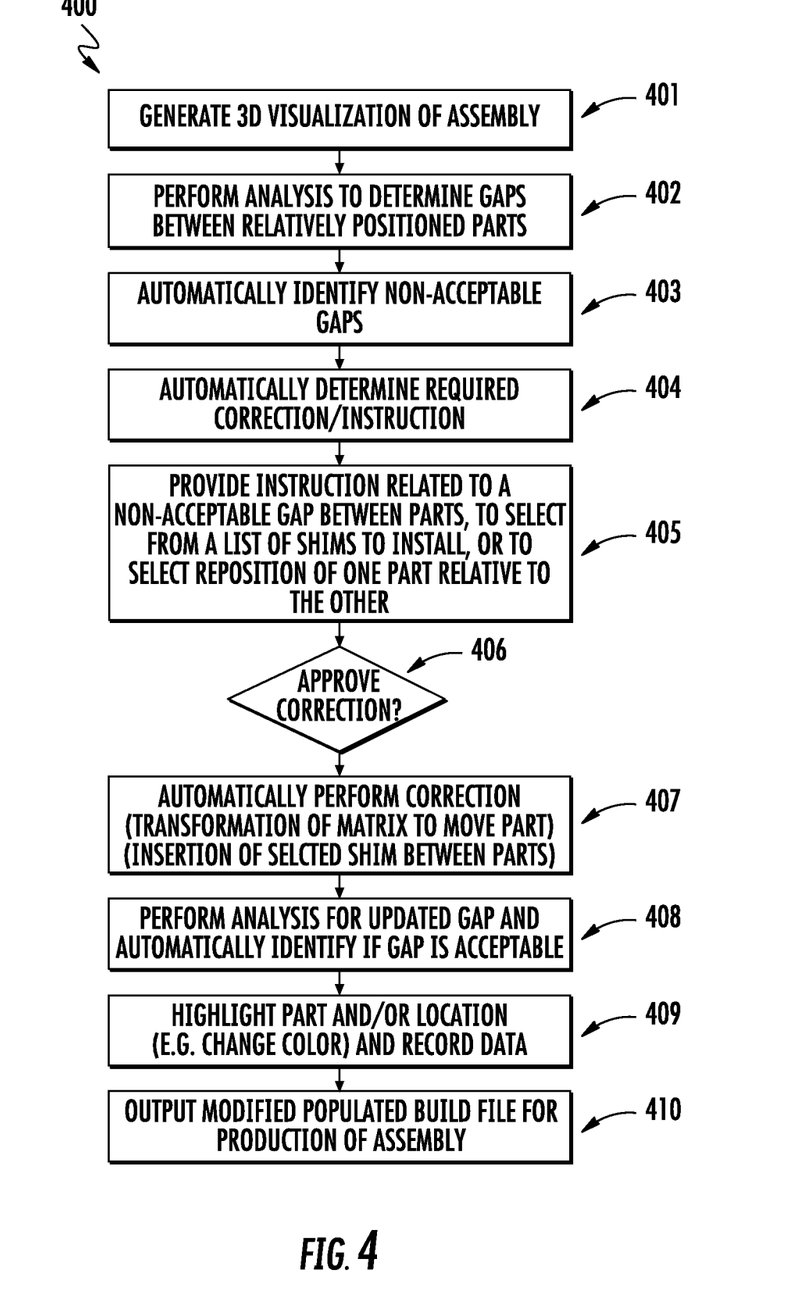
FIG. 4 illustrates a process of determining and correcting non-acceptable gaps, according to another example implementation.

FIG. 4 illustrates a process 400 of determining and correcting non-acceptable gaps, according to another example implementation. As shown, at block 401, the visualization application 101 is configured to generate 3D visualization of the assembly. The 3D visualization includes 3D models of a plurality of parts in the assembly, the 3D models being relatively positioned as are the plurality of parts in the assembly. At blocks 402 and 403, the proximity analysis application 102 is configured to respectively perform analysis to determine gaps between relatively positioned parts and automatically identify non-acceptable gaps.

At block 404, the data analysis application 103 is configured to automatically determine required correction and instruction. At block 405, the data analysis application is configured to provide instruction related to a non-acceptable gap between parts, to select from a list of a plurality of different thickness shims to install such that a model of the selected shim is positioned between the relatively positioned parts to thereby reduce the non-acceptable gap to a spacing within an acceptable gap range, or to select reposition of one part relative to the other. At block 406, the data analysis application is configured to determine whether the correction is approved. After the correction is approved, at block 407, the data analysis application is configured to automatically perform the correction. Performing the correction may include using a transformation matrix to move a part model with respect to a relatively positioned part model to adjust the gap to within an acceptable gap range, or may provide for insertion of selected shim between the parts.

At block 408, the data analysis application 103 is configured to perform a further analysis for the updated gap and confirm that the non-acceptable gap as corrected is acceptable. For example, the data analysis application is configured to confirm that the non-acceptable gap as corrected does not have a gap distance that exceeds the acceptable gap threshold. At block 409, the data analysis application is configured to highlight part and/or location, e.g., by changing color, and record data of the gap analysis. In one example, the display device 104 can display the highlighted part and/or location. At block 410, the data analysis application is configured to generate an output of a 3D model of the assembly populated with the revised 3D models of the parts relatively positioned and updated with shims and/or with the updated gap in place of the non-acceptable gap, as corrected for use in connection with production of the assembly. The output may include a modified populated build file. The method may further include performing the step of production of the assembly to include the modified build file that includes updated gaps and/or shims between relatively positioned parts.

Figure 5:
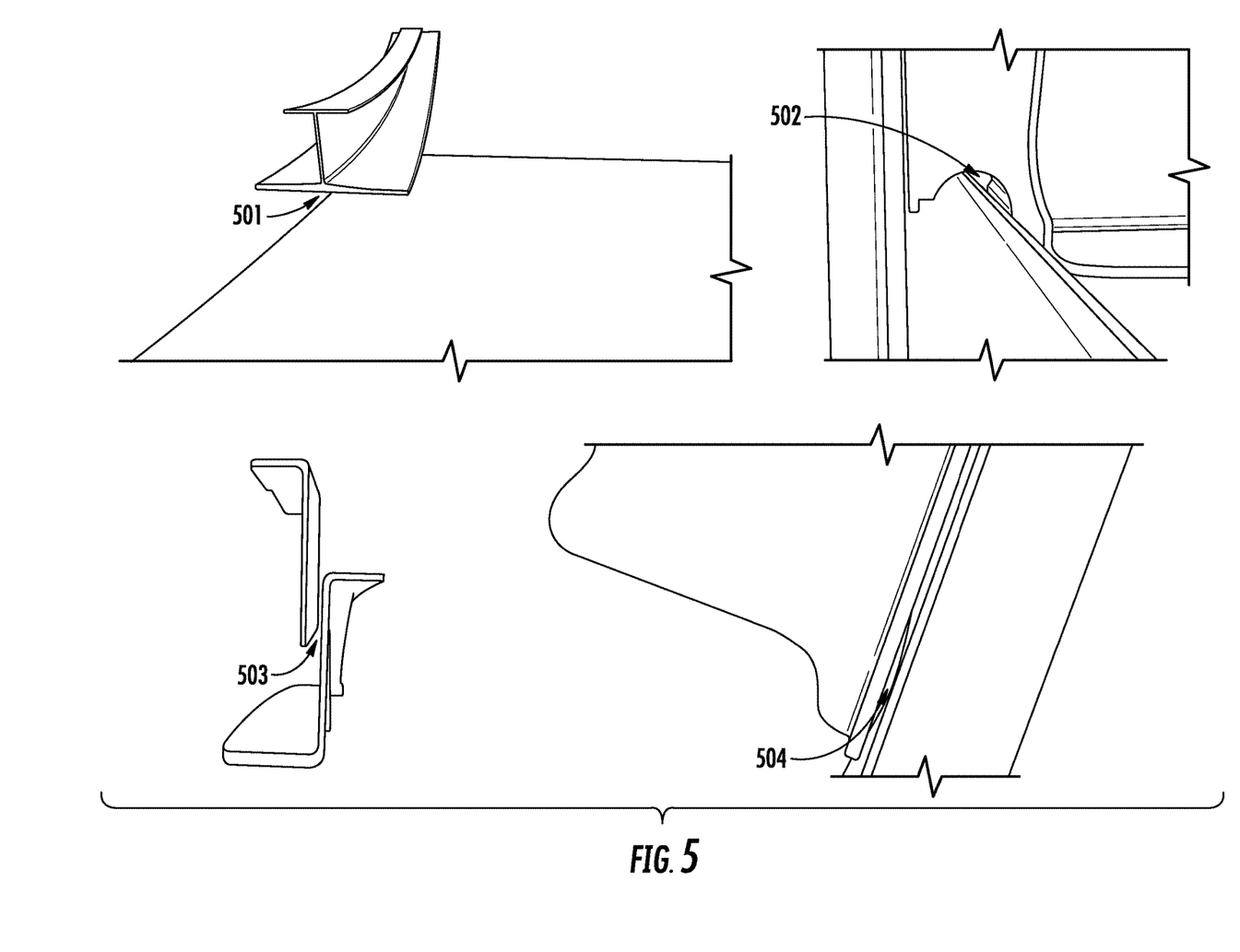
FIG. 5 illustrates detected gaps, according to various example implementations.

FIG. 5 illustrates detected gaps, according to various example implementations. As shown, the proximity analysis application 102 can detect gaps between 3D models of a plurality of parts in the assembly. In one example, the detected gaps are indicated by arrows 501, 502, 503 and 504. It may be impractical to detect at least some of the detected gaps, e.g. the small gap 504, through conventional visual inspection.

Figure 6:
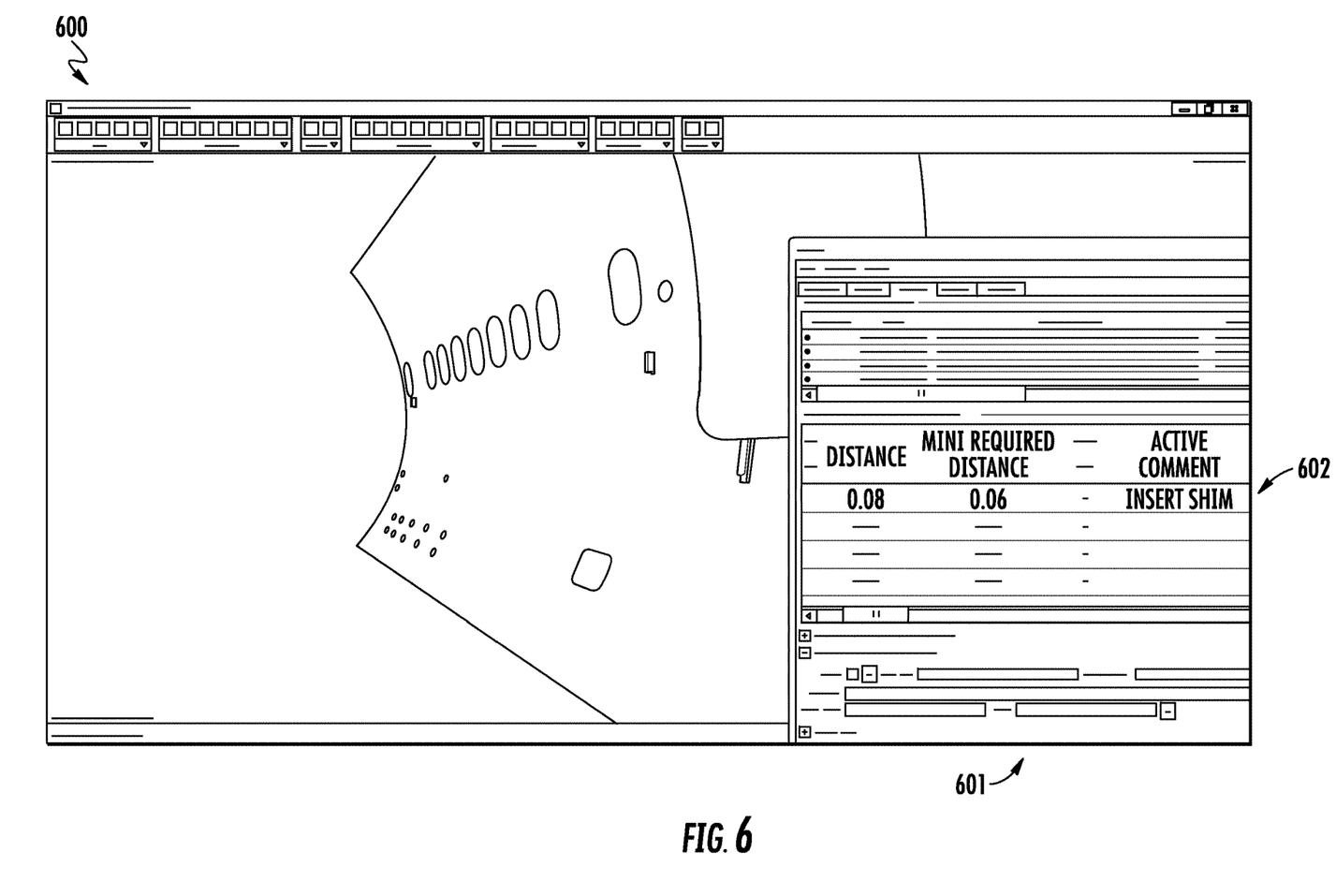
FIG. 6 illustrates an output of gap analysis, according to various example implementations.

FIG. 6 illustrates an output 600 of gap analysis, according to various example implementations. FIG. 6 shows an example of several shear ties that have gaps with the skin of an aircraft. An output 601 includes the results of the gap analysis. The output 601 may be displayed to the user using the display device 104. In one example, in order to correct the engineering design prior to final release, the non-acceptable gaps should be corrected in the engineering model. For example, as indicated by arrow 602, for a gap with a gap distance that is larger than the required minimum distance, a shim is inserted to fix the non-acceptable gap.

In one example, the gap analysis can be performed daily on all the parts of an assembly to be produced, e.g., an aircraft, which results in a list of all the parts/locations that contain these engineering design defects. The display device 104 can show parts and their relative locations. The list can be dispositioned by designers to indicate if there is a problem and who will fix it. Designs with certain disposition codes reflecting problems will not be released for manufacture. High level reports will show how many non-acceptable gaps exist on an assembly.

Figure 7:
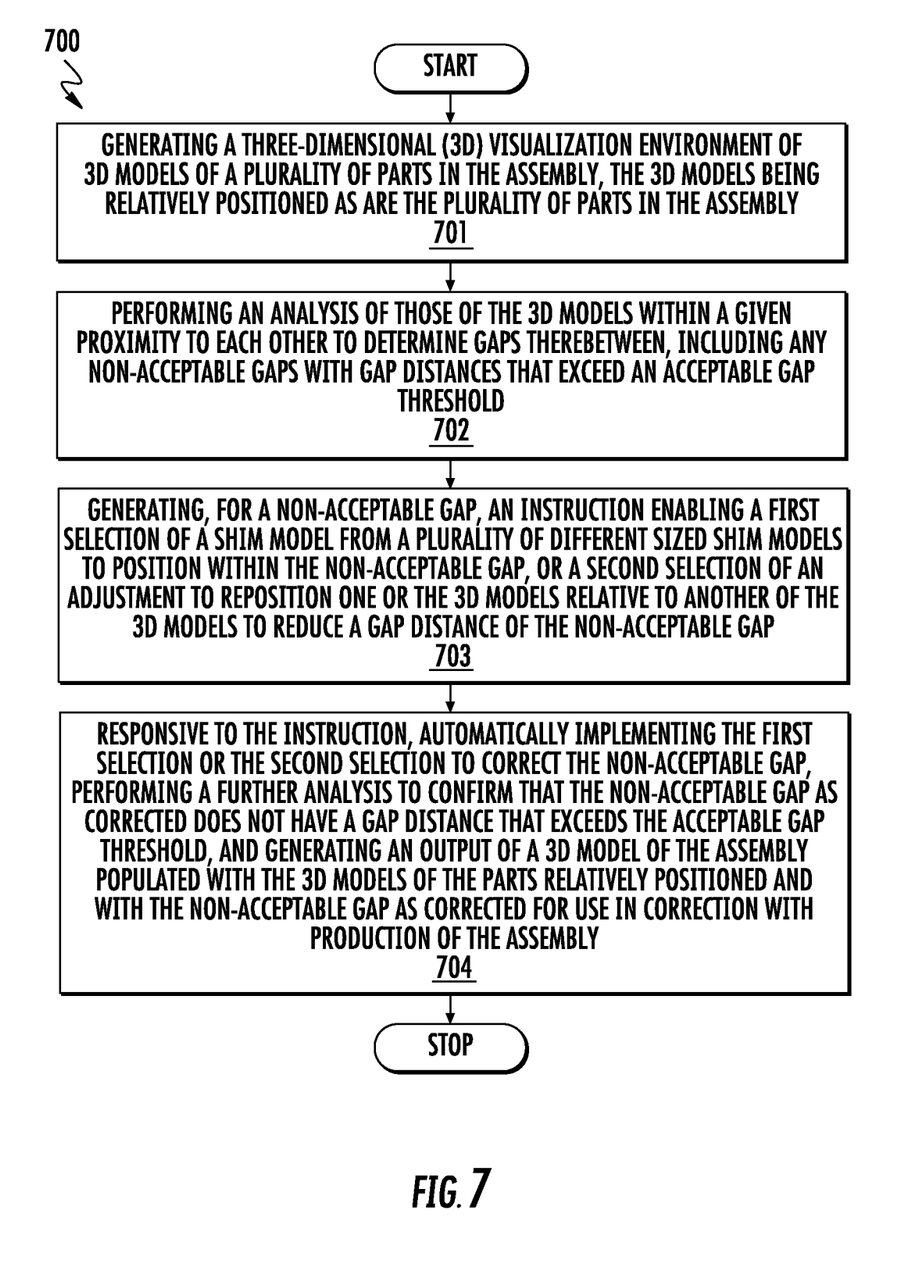
FIG. 7 is a flowchart illustrating various operations in a method of performing analysis of gaps between modeled parts of an assembly to be produced, according to various example implementations.

FIG. 7 is a flowchart illustrating various operations in a method 700 of performing analysis of gaps between modeled parts of an assembly to be produced, according to various example implementations. As shown, at block 701, the method includes generating a three-dimensional (3D) visualization environment of 3D models of a plurality of parts in the assembly, the 3D models being relatively positioned as are the plurality of parts in the assembly.

At block 702, the method 700 includes performing an analysis of those of the 3D models within a given proximity to each other to determine gaps therebetween, including any non-acceptable gaps with gap distances that exceed an acceptable gap threshold.

At block 703, the method 700 includes generating, for a non-acceptable gap, an instruction enabling a first selection of a shim model from a plurality of different sized shim models to position within the non-acceptable gap, or a second selection of an adjustment to reposition one of the 3D models relative to another of the 3D models to reduce a gap distance of the non-acceptable gap.

At block 704, the method 700 includes responsive to the instruction, automatically implementing the first selection or the second selection to correct the non-acceptable gap. A further analysis is performed to confirm that the non-acceptable gap as corrected does not have a gap distance that exceeds the acceptable gap threshold. And an output of a 3D model of the assembly is generated in which the 3D model is populated with the 3D models of the parts relatively positioned and with the non-acceptable gap as corrected for use in connection with production of the assembly.

According to example implementations of the present disclosure, the system 100 and its subsystems including the visualization application 101, proximity analysis application 102, data analysis application 103 and display device 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 8:
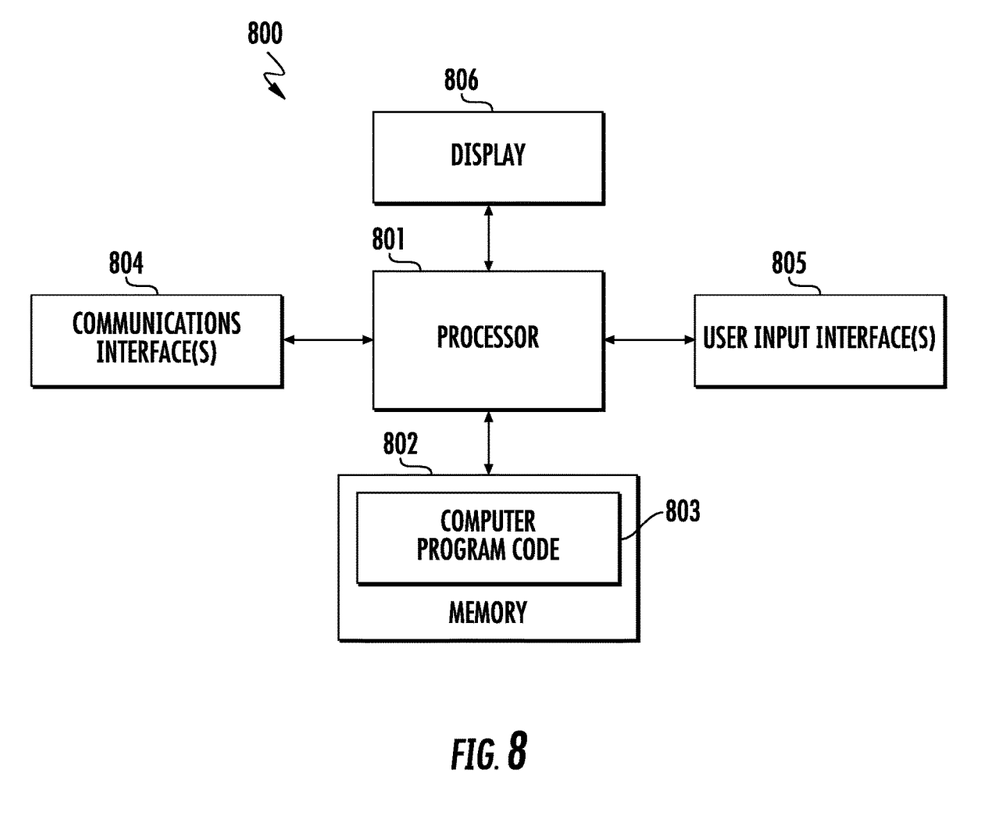
FIG. 8 illustrates an apparatus according to some example implementations.

FIG. 8 illustrates an apparatus 800 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 801 (e.g., processing circuitry) connected to a memory 802 (e.g., storage device). In some examples, the apparatus 800 implements the system 100.

The processor 801 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 802 (of the same or another apparatus).

The processor 801 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 802 is generally any piece of computer hardware that is capable of storing information such as, for example, data, computer programs (e.g., computer-readable program code 803) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 802, the processor 801 may also be connected to one or more interfaces for displaying, transmitting and/or receiving information. The interfaces may include a communications interface 804 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 806 and/or one or more user input interfaces 805 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the display 806 can be the display device 104.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 800 may include a processor 801 and a computer-readable storage medium or memory 802 coupled to the processor, where the processor is configured to execute computer-readable program code 803 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a system for analysis of gaps between modeled parts of an assembly to be produced, the apparatus comprising a processor and a memory storing executable instructions that in response to execution by the processor cause the apparatus to implement at least:

a visualization application configured to generate a three-dimensional (3D) visualization environment of 3D models of a plurality of parts in the assembly, the 3D models being relatively positioned as are the plurality of parts in the assembly;

a proximity analysis application configured to perform an analysis of those of the 3D models within a given proximity to each other to determine gaps therebetween, including any non-acceptable gaps with gap distances that exceed an acceptable gap threshold, wherein the 3D models of the plurality of parts include polygonal models of the plurality of parts, and the proximity analysis application being configured to perform the analysis includes being configured to at least:

define, for the polygonal models, a set of padded voxels inclosing a polygonal triangle mesh to determine a reduced candidate set of the polygonal models for analysis of gaps; and determine a minimum distance between each pair of the reduced candidate set of the polygonal models using a triangle-to-triangle minimum distance algorithm between the pair;

a data analysis application configured to generate, for a non-acceptable gap, an instruction enabling a first selection of an individual shim model from a plurality of different sized shim models to position within the non-acceptable gap, where the data analysis application is responsive to the instruction and further configured to automatically implement the first selection to correct the non-acceptable gap, perform a further analysis to confirm that the non-acceptable gap as corrected does not have a gap distance that exceeds the acceptable gap threshold, and generate an output of a 3D model of the assembly populated with the 3D models of the parts relatively positioned and with the non-acceptable gap as corrected for use in connection with production of the assembly.

2. The apparatus of claim 1, wherein the reduced candidate set of the polygonal models includes the polygonal models of only those of the plurality of parts with a physical or functional interface between them.

3. The apparatus of claim 1, wherein the proximity analysis application being configured to perform the analysis includes being configured to perform the analysis to determine the gaps including an acceptable gap between two of the 3D models with a gap distance that exceeds the acceptable gap threshold, and an intervening one of the 3D models positioned therein.

4. The apparatus of claim 1, wherein the data analysis application being configured to generate the instruction for the non-acceptable gap includes being configured to generate a respective instruction for each of the non-acceptable gaps, and wherein the data analysis application being responsive to the instruction and further configured to automatically implement the first selection includes being responsive to the respective instruction and further configured to automatically implement the first selection to correct all the non-acceptable gaps and release the 3D model of the assembly with all the non-acceptable gaps as corrected for production of the assembly.

5. The apparatus of claim 4, wherein the data analysis application being configured to generate the instruction for the non-acceptable gap includes being configured to generate a respective instruction for each of the non-acceptable gaps, and wherein the data analysis application is configured to generate, for a non-acceptable gap, an instruction enabling the first selection and a second selection of an adjustment to reposition one of the 3D models relative to another of the 3D models to reduce a gap distance of the non-acceptable gap, the data analysis application being responsive to the instruction and further configured to automatically implement the second selection to correct all the non-acceptable gaps and release the 3D model of the assembly with all the non-acceptable gaps as corrected for production of the assembly.

6. The apparatus of claim 1, wherein the data analysis application is further configured to generate, for another non-acceptable gap, an indication that the first selection is not allowable to correct the other non-acceptable gap, and the data analysis application is responsive to the indication and further configured to generate another indication that production of the assembly is on hold.

7. A method of performing analysis of gaps between modeled parts of an assembly to be produced, comprising:

generating a three-dimensional (3D) visualization environment of 3D models of a plurality of parts in the assembly, the 3D models being relatively positioned as are the plurality of parts in the assembly;

performing an analysis of those of the 3D models within a given proximity to each other to determine gaps therebetween, including any non-acceptable gaps with gap distances that exceed an acceptable gap threshold wherein the 3D models of the plurality of parts include polygonal models of the plurality of parts, and performing the analysis includes:

defining, for the polygonal models, a set of padded voxels inclosing a polygonal triangle mesh to determine a reduced candidate set of the polygonal models for analysis of gaps; and determining a minimum distance between each pair of the reduced candidate set of the polygonal models using a triangle-to-triangle minimum distance algorithm between the pair;

generating, for a non-acceptable gap, an instruction enabling a first selection of an individual shim model from a plurality of different sized shim models to position within the non-acceptable gap; and responsive to the instruction, automatically implementing the first selection to correct the non-acceptable gap, performing a further analysis to confirm that the non-acceptable gap as corrected does not have a gap distance that exceeds the acceptable gap threshold, and generating an output of a 3D model of the assembly populated with the 3D models of the parts relatively positioned and with the non-acceptable gap as corrected for use in connection with production of the assembly.

8. The method of claim 7, wherein the method is performed by a processor of a computing device.

9. The method of claim 7, wherein the reduced candidate set of the polygonal models includes the polygonal models of only those of the plurality of parts with a physical or functional interface between them.

10. The method of claim 7, wherein performing the analysis includes performing the analysis to determine the gaps including an acceptable gap between two of the 3D models with a gap distance that exceeds the acceptable gap threshold, and an intervening one of the 3D models positioned therein.

11. The method of claim 7, wherein generating the instruction for the non-acceptable gap includes generating a respective instruction for each of the non-acceptable gaps, and wherein responsive to the instruction, automatically implementing the first selection includes responsive to the respective instruction, automatically implementing the first selection to correct all the non-acceptable gaps and release the 3D model of the assembly with all the non-acceptable gaps as corrected for production of the assembly.

12. The method of claim 7, further comprising generating, for another non-acceptable gap, an indication that the first selection is not allowable to correct the other non-acceptable gap, and responsive to the indication, generating another indication that production of the assembly is on hold.

13. A computer-readable storage medium for analysis of gaps between modeled parts of an assembly to be produced, the computer-readable storage medium being non-transitory and having computer-readable program code stored therein that in response to execution by a processor, causes an apparatus to at least:

generate a three-dimensional (3D) visualization environment of 3D models of a plurality of parts in the assembly, the 3D models being relatively positioned as are the plurality of parts in the assembly;

perform an analysis of those of the 3D models within a given proximity to each other to determine gaps therebetween, including any non-acceptable gaps with gap distances that exceed an acceptable gap threshold wherein the 3D models of the plurality of parts include polygonal models of the plurality of parts, and the apparatus caused to perform the analysis includes the apparatus caused to:

define, for the polygonal models, a set of padded voxels inclosing a polygonal triangle mesh to determine a reduced candidate set of the polygonal models for analysis of gaps; and determine a minimum distance between each pair of the reduced candidate set of the polygonal models using a triangle-to-triangle minimum distance algorithm between the pair;

generate, for a non-acceptable gap, an instruction enabling a first selection of an individual shim model from a plurality of different sized shim models to position within the non-acceptable gap; and responsive to the instruction, automatically implement the first selection to correct the non-acceptable gap, perform a further analysis to confirm that the non-acceptable gap as corrected does not have a gap distance that exceeds the acceptable gap threshold, and generate an output of a 3D model of the assembly populated with the 3D models of the parts relatively positioned and with the non-acceptable gap as corrected for use in connection with production of the assembly.

14. The computer-readable storage medium of claim 13, wherein the reduced candidate set of the polygonal models includes the polygonal models of only those of the plurality of parts with a physical or functional interface between them.

15. The computer-readable storage medium of claim 13, wherein the apparatus being caused to perform the analysis includes being caused to perform the analysis to determine the gaps including an acceptable gap between two of the 3D models with a gap distance that exceeds the acceptable gap threshold, and an intervening one of the 3D models positioned therein.

16. The computer-readable storage medium of claim 13, wherein the apparatus being caused to generate the instruction for the non-acceptable gap includes being caused to generate a respective instruction for each of the non-acceptable gaps, and wherein the apparatus being caused to responsive to the instruction, automatically implement the first selection includes being caused to responsive to the respective instruction, automatically implement the first selection to correct all the non-acceptable gaps and release the 3D model of the assembly with all the non-acceptable gaps as corrected for production of the assembly.

17. The computer-readable storage medium of claim 13, having further computer-readable program code stored therein that in response to execution by the processor, causes the apparatus to further generate, for another non-acceptable gap, an indication that the first selection is not allowable to correct the other non-acceptable gap, and responsive to the indication, generate another indication that production of the assembly is on hold.

* * * * *